United States Patent
Shi (10) Patent No.: US 11,120,812 B1
(45) Date of Patent: Sep. 14, 2021

(54) APPLICATION OF MACHINE LEARNING TECHNIQUES TO SELECT VOICE TRANSFORMATIONS

(71) Applicant: CRESTA INTELLIGENCE INC., San Francisco, CA (US)

(72) Inventor: Tianlin Shi, Menlo Park, CA (US)

(73) Assignee: CRESTA INTELLIGENCE INC., San Francisco, CA (US)

( * ) Notice: Subject to any disclaimer, the term of this patent is extended or adjusted under 35 U.S.C. 154(b) by 0 days.

(21) Appl. No.: 17/130,157

(22) Filed: Dec. 22, 2020

Related U.S. Application Data (63) Continuation-in-part of application No. 16/944,651, filed on Jul. 31, 2020, now Pat. No. 10,970,485.

(51) Int. Cl.
| | | |
|---|---|---|
| *G10L 21/013* | (2013.01) | |
| *G10L 15/06* | (2013.01) | |
| *G06N 20/00* | (2019.01) | |
| *G10L 15/22* | (2006.01) | |
| *G10L 25/51* | (2013.01) | |
| *G10L 25/90* | (2013.01) | |

(52) U.S. Cl.
CPC ............ *G10L 21/013* (2013.01); *G06N 20/00* (2019.01); *G10L 15/063* (2013.01); *G10L 15/22* (2013.01); *G10L 25/51* (2013.01); *G10L 25/90* (2013.01); *G10L 2015/228* (2013.01); *G10L 2021/0135* (2013.01)

(58) Field of Classification Search
CPC ....... G10L 21/013; G10L 15/22; G10L 25/51; G10L 25/90; G10L 2015/228; G10L 2021/0135; G10L 15/063; G06N 20/00
See application file for complete search history.

(56) References Cited

U.S. PATENT DOCUMENTS

| | | | |
|---|---|---|---|
| 9,875,740 B1 | 1/2018 | Kumar et al. | |
| 10,586,237 B2 | 3/2020 | Coughlin et al. | |
| 10,726,847 B1* | 7/2020 | Hardage | G10L 17/00 |
| 2008/0046386 A1* | 2/2008 | Pieraccinii | G06Q 10/10 |
| | | | 705/402 |
| 2010/0274618 A1 | 10/2010 | Byrd et al. | |
| 2014/0301540 A1 | 10/2014 | Skiba et al. | |
| 2015/0039536 A1 | 2/2015 | Cook et al. | |
| 2015/0088998 A1 | 3/2015 | Isensee et al. | |
| 2015/0170213 A1 | 6/2015 | O'Malley | |
| 2016/0006871 A1* | 1/2016 | O'Connor | H04M 3/5175 |
| | | | 379/265.05 |
| 2017/0214779 A1* | 7/2017 | Moran | G10L 15/26 |
| 2017/0244834 A1* | 8/2017 | Flores | H04M 3/4936 |
| 2017/0337200 A1 | 11/2017 | Teofili et al. | |
| 2018/0376002 A1 | 12/2018 | Phillip | |
| 2020/0274970 A1 | 8/2020 | Ding et al. | |
| 2020/0329144 A1 | 10/2020 | Morgan et al. | |

* cited by examiner

*Primary Examiner* — Sonia L Gay
(74) *Attorney, Agent, or Firm* — Invoke (57) ABSTRACT

Techniques for monitoring a conversation in real-time to detect attributes of a conversation, identifying a desired outcome of the conversation, and identifying voice modulations that may be applied to the agent's voice to help accomplish the desired outcome are disclosed. The system may identify voice modulations by comparing a current conversation to one or more prior conversations having desired outcomes similar to that of the current conversation. A trained machine learning model may select and apply voice modulations associated with accomplishing a desired outcome.

21 Claims, 5 Drawing Sheets

APPLICATION OF MACHINE LEARNING TECHNIQUES TO SELECT VOICE TRANSFORMATIONS

INCORPORATION BY REFERENCE; DISCLAIMER

This application is hereby incorporated by reference: application Ser. No. 16/944,651 filed on Jul. 31, 2020. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to real-time analysis of conversations. In particular, the present disclosure relates to the application of machine learning techniques to select voice transformations of a voice belonging to a call participant.

BACKGROUND

One challenge faced by customer support agents is managing their speaking manner in a way that will most effectively accomplish a desired outcome of a conversation. Generally a person must make a conscious effort to change a rate of speech, a vocal cadence, or a tone. This effort is particularly difficult to maintain in a call center environment in which the number of calls, and the diversity of calls, is high. Furthermore, even assuming a customer support agent could maintain the effort to intentionally change vocal characteristics, it is unlikely that the customer support agent would also be able to select new vocal characteristics for each separate call over the course of a workday. This is unlikely for the simple reason that an agent may not know what combination of voice characteristics are likely to help accomplish a desired outcome for distinct calls that are likely to have different callers, different issues, and may even involve different products.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. VOICE MODULATION SELECTION USING CONFIDENCE SCORES
4. VOICE MODULATION SELECTION USING A TRAINED MACHINE LEARNING MODEL
5. COMPUTER NETWORKS AND CLOUD NETWORKS
6. MISCELLANEOUS; EXTENSIONS
7. HARDWARE OVERVIEW

1. General Overview

One or more embodiments apply voice modulations to generate certain characteristics for a voice to achieve a desired outcome of a conversation. The system trains a machine-learning model using a set of conversations and outcomes to map voice characteristics (also referred to as "modulations") to outcomes. When a particular outcome is desired for a conversation, the system identifies a set of voice characteristics that have been mapped to that particular outcome. The system applies voice modulations to a voice in real-time during a conversation to generate the set of voice characteristics for the voice. The set of conversations, used by the machine-learning model for selecting a voice modulation for a current conversation, may include conversations that meet a similarity threshold in relation to the current conversation.

One or more embodiments determine a confidence score, for each of a set of candidate voice modulations, to achieve a desired outcome for a conversation. The confidence score for a voice modulation may be associated with a rate at which conversations with the voice characteristics, generated by that candidate voice modulation, result in the desired outcome. The system selects a candidate voice modulation for applying to a voice based on the corresponding confidence score.

One or more embodiments described in this Specification and/or recited in the claims may not be included in this General Overview section.

2. Architectural Overview

Figure 1:
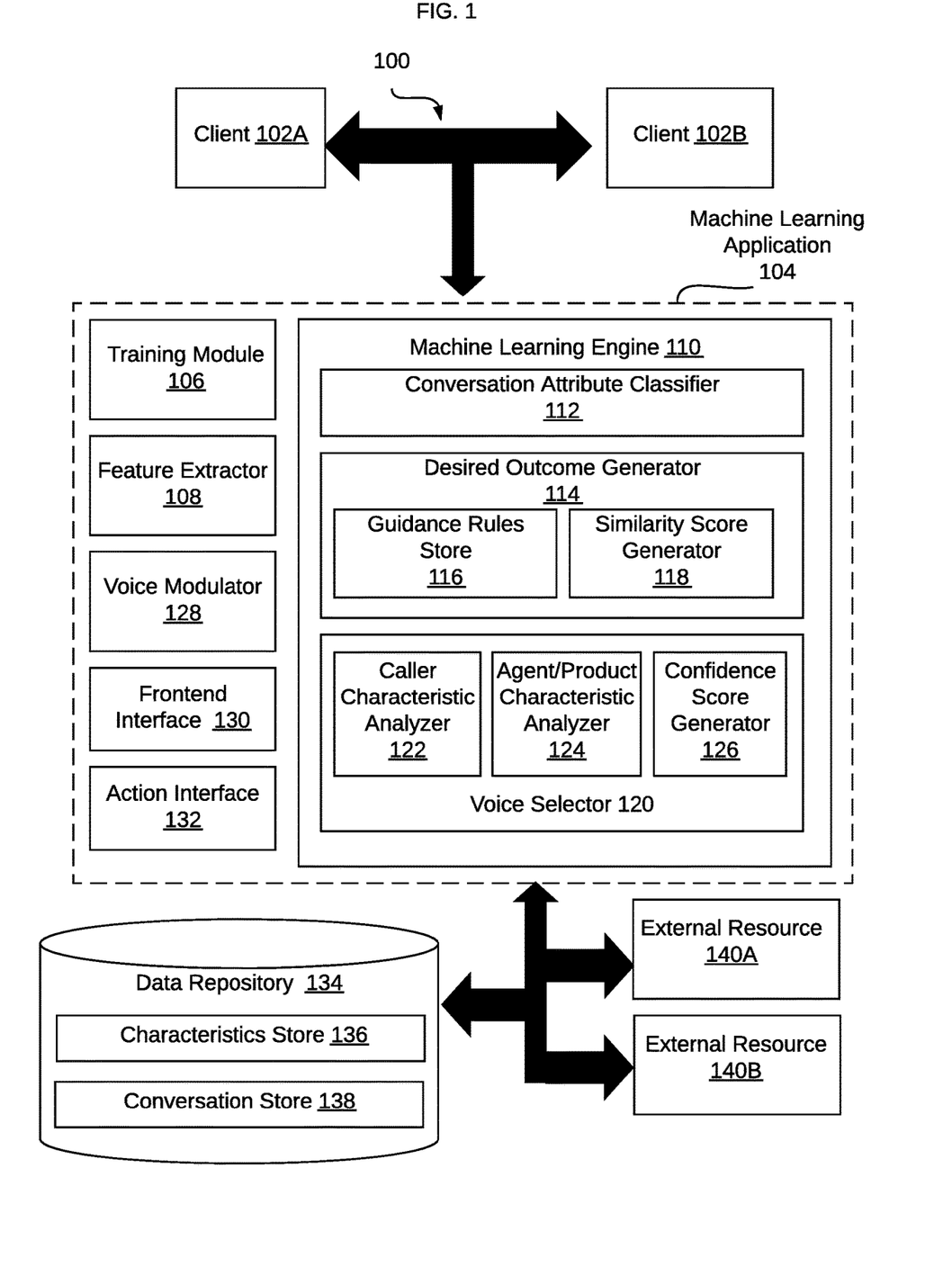
FIG. 1 illustrates a system for selecting a voice transformation of a voice of an agent, in real time, to improve a desired outcome of a voice call, in accordance with one or more embodiments.

FIG. 1 illustrates a conversation analysis system 100 in accordance with one or more embodiments. In the embodiment shown, the conversation analysis system 100 includes clients 102A, 102B, a machine learning (ML) application 104, a data repository 134, and external resources 140A, 140B. In one or more embodiments, the system 100 may include more components than those illustrated in FIG. 1. The components illustrated in FIG. 1 may be local to or remote from other components used by the system 100. The components illustrated in FIG. 1 may be implemented in software and/or hardware and may be distributed over one or more applications and/or machines. Operations described with respect to the components illustrated in FIG. 1 may be instead performed by one or more other components.

In some embodiments, ML application 104 provides components through which conversations can be monitored and analyzed in real time by, for example, identifying one or more attributes of the conversation. Based on identified attributes, a desired outcome to the conversation may be identified.

The system may identify and apply one or more voice modulations to an agent's voice to advance the conversation to the desired outcome. The voice modulations may be associated with a confidence score that indicates a likelihood of accomplishing the desired outcome of the conversation in response to applying the voice modulation. In another example, a trained machine learning (ML) model may identify one or more voice modulations that may be applied to an agent's voice. The system may select voice modulations identified for advancing a conversation to a desired outcome based on not only a conversation type, but also one or more of a product or service that is the subject of the conversation, attributes (e.g., demographic attributes, purchase history) associated with a caller, and/or agent attributes (e.g., natural voice characteristics of the agent).

The components of the ML application 104 may include a training module 106, a feature extractor 108, an ML engine 110, a voice modulator 128, a frontend interface 130, and an action interface 132. However, as previously indicated, the components of system 100, including ML application 104 may vary depending on the particular implementation.

In some embodiments, training module 106 receives a set of electronic documents as input (i.e., a training corpus). Examples of electronic documents include, but are not limited to, electronically stored recordings of conversations, electronically stored transcriptions of conversations, feature vectors, among other training materials.

A conversation or conversation file (e.g., a recording) used for the training module 106 may include labels that identify conversation attributes and labels that indicate different voice modulations and/or voice characteristics. The conversation attributes may be associated with interim and/or ultimate desired outcomes. The system may then use these labeled attributes to identify and/or select voice modulations to be applied to the voice of an agent, in real-time, in new, "target" conversations.

The training module 106 may be in communication with clients 102A, 102B. If one of the clients 102A, 102B is an interface used by agents to communicate, the other illustrated client 102A, 102B may be used to apply labels to a target conversation contemporaneous with the target conversation itself. Alternatively, labels may be applied via one of the clients 102A, 102B in stored conversations and used to train the machine learning application 104 offline.

The training module 106 may execute ML training algorithms to build a trained ML model ultimately stored in the ML learning engine 110. Once trained, the ML learning engine 110 may then be used to contemporaneously identify attributes of a target conversation. Example ML training algorithms and ML models include, but are not limited to, supervised learning algorithms (e.g., neural networks).

In some embodiments, feature extractor 108 is configured to identify feature values and generate feature vectors from conversation documents. The feature extractor 108 may tokenize words and phrases in a training corpus into vocabulary tokens. The feature extractor 108 may then generate feature vectors that include a sequence of values, with each value representing a different vocabulary token. Examples of feature vectors generated by the feature extractor 108 include, but are not limited to, term frequency feature vectors and term-frequency/inverse document frequency feature vectors. The labels assigned to words and phrases in the training corpus documents may then be associated with corresponding feature vectors.

The feature extractor 108 may append other features to the generated feature vectors. In one example, a feature vector may be represented as $[f_1, f_2, f_3, f_4]$, where $f_1, f_2, f_3$ correspond to tokens and where $f_4$ is a non-vocabulary feature. Example non-vocabulary features may include, but are not limited to, one or more of the various voice characteristics that may be modulated according to the techniques described below. These voice characteristics may include, a pitch, a tone, a rhythm, a resonance, a tempo, texture (including range of tones, feeling), an accent associated with a regional accent or language dialect, and inflection, among others. Another example of a non-vocabulary feature is a content density that quantifies a number of concepts presented per unit time or per word during a conversation. The feature extractor 108 may optionally be applied to target conversations to facilitate their analysis.

The ML engine 110 is configured to automatically learn, from the training module 106 and the feature extractor 108, conversational attributes of training corpus conversations. The ML engine 110 is also configured to contemporaneously identify attributes in a new ("target") conversation. The ML engine 110 can then identify one or more desired outcomes for a conversation based on the identified attributes. Desired outcomes identified by the ML engine 110 may then be used by other elements of the ML application 104 to identify one or more voice modulations that may be applied to a voice of an agent during a target conversation. In addition, the ML engine may access or identify caller attributes, agent attributes, and/or product attributes that may be used to identify and select the one or more voice modulations to apply to a voice of an agent. Some embodiments of the ML engine 110 may generate corresponding confidence levels associated with one or more voice modulations for accomplishing a desired outcome of the conversation.

The ML engine 110 includes, in the example shown, a conversation attribute classifier 112, a desired outcome generator 114, and a voice selector 120.

The conversation attribute classifier 112 is configured for identifying attributes of target conversations (i.e., contemporaneously analyzed target conversations not in the training corpus). The conversation attribute classifier 112 may receive feature vectors from the feature extractor 108 of conversations in the training corpus that have been analyzed and labeled in the training module 106.

In some examples, a conversation attribute may include a type of conversation, a conversation type (e.g., a sales conversation, a help desk conversation such as for information technology (IT) support), a tone or emotional state of the caller (e.g., excitement, impatience, frustration, exasperation, patience). In other examples, a conversation attribute may include a product or service being discussed, caller demographic attributes or purchase history attributes, and agent voice attributes.

In some examples, one type of label associated with a conversation in the training corpus may identify a desired outcome of a corresponding conversation. In other examples, additional labels may identify multiple desired outcomes at various stages within a conversation, such as interim desired outcomes that progressively advance a conversation toward an ultimate desired outcome. For example, interim desired outcomes may include establishing rapport with a customer, obtaining further information, identifying price sensitivity, identifying a technical problem, identifying a problem, identifying a product of interest, among others. These interim desired outcomes (and their corresponding labels) may be associated with an ultimate desired conversation outcome (and a corresponding label). Examples of ultimate desired outcomes include completing a sale, resolving a technical problem, resolving a complaint, retaining a customer (e.g., continuing a subscription), among other similar ultimate outcomes. Other examples of desired outcomes include establishing a rate of successful sales for an agent or an agent organization (e.g., a number of sales per a unit number of calls), generating a minimum threshold of sales per order, generating a minimum rate of increased value sales in which a customer is sold a higher value product than the product initially queried. Still other examples include objectives that measure an agent's success. Agent success outcomes include establishing a minimum customer satisfaction threshold, an agent call efficiency (e.g., number of desired outcomes accomplished per unit time or per unit number of calls), or an average call time. These examples are provided for illustration purposes only.

The desired outcome generator 114 receives attributes from the conversation attribute classifier 112 for a target conversation. Using the received attributes, the desired outcome generator 114 generates one or more desired outcomes for the target conversation. As indicated above, this analysis may be executed contemporaneously with the target conversation so that voice modulations may be applied to an agent's voice in real-time, thereby increasing a likelihood that one or more desired outcomes of the conversation may be accomplished.

The desired outcome generator 114 may store multiple desired outcomes that are associated with one or more conversation attributes. In this way, the attributes identified in a target conversation may be used to identify, by association, one or more desired outcomes. In one example, the conversation attribute classifier 112 may identify attributes for a particular conversation or one or more portions of a conversation so that one or more desired outcomes are selected contemporaneously with the conversation.

Associations between stored desired outcomes and conversation attributes may be stored in the guidance rules store 116. In one embodiment, a plurality of guidance rules that are stored in the guidance rules store 116 may associate various combinations of keywords, key phrases, elapsed time of a conversation, conversation metadata, caller characteristics, and/or conversation types with one or more desired outcomes of the target conversation. In one embodiment, the guidance rules store 116 stores a plurality of associations between conversation attributes and desired outcomes (conveniently referred to as "guidance rules") that are global to all users of the system 100. These global guidance rules can be formed based on ML training algorithms that use conversation(s) from any user as a training corpus. In another embodiment, the guidance rules store 116 stores guidance rules that are generated (e.g., via an ML training algorithm) based on a particular user (e.g., an agent), product type, or other group. In this case, at least a portion of the training corpus includes conversations specific to the group.

In some cases, a labeled training corpus corresponding to a particular user (i.e., a customer support agent) may also be used in cooperation with a user attribute profile. The user attribute profile may include the industry in which the agent works, the product types or product lines the agent works with, the type of conversations the agent typically engages in (sales, help, product support, complaints, customer retention), performance metrics associated with call types, efficiency, productivity, success rate, and others. Using conversations for the training corpus associated with a particular agent enables training specific to that user, thus personalizing the analysis and guidance for that particular agent. In other examples, a combination of global and user-specific guidance rules can be stored in the guidance rule store 116.

In some examples, the desired outcome generator 114 may include a similarity score generator 118. The similarity score generator 118 may analyze stored, prior conversations to identify a subset of the stored conversation that share one or more of attributes, desired outcomes, and/or voice modulations with a target conversation. The conversations in the subset may be identified by, for example, executing a similarity analysis between feature vectors of the target conversation and one or more prior conversations that represent attributes and/or desired outcomes corresponding to the conversations. For example, the system may execute a cosine similarity computation. The prior conversations having a similarity above a threshold similarity score (e.g., 0.9, 0.8, 0.5) or a subset of the most similar (e.g., top 5, top 10, top 100) may be selected for further analysis. For example, the identified subset, and their corresponding desired outcomes, attributes, and voice characteristics may be passed to the voice selector 120 for additional analysis.

During contemporaneous analysis of a target conversation, the voice selector 120 may receive a desired outcome from the desired outcome generator 114 (and optionally, references to a subset of similar conversations). The voice selector 120 may also select one or more voice modulations that are likely to improve the likelihood of the desired outcome associated with the conversation being accomplished.

To select one or more voice modulations, the voice selector 120 may include a caller characteristic analyzer 122, an agent characteristic analyzer 124, and a confidence score generator 126. The characteristic analyzer 122, the agent characteristic analyzer 124, and the confidence score generator 126 may collect and analyze data contemporaneously with a particular call. In some examples, the caller characteristic analyzer 122, the agent characteristic analyzer 124, and the confidence score generator 126 may receive conversation attributes and a desired outcome (or outcomes) from the conversation attribute classifier 112 and/or the desired outcome generator 114. Regardless of a source of the data, once the voice selector 120 identifies one or more voice modulations to apply to an agent's voice, the selected voice modulations may be passed to the voice modulator 128.

The caller characteristic analyzer 122 may receive data corresponding to a conversation and characterize a voice of a caller speaking to an agent. The caller characteristic analyzer 122 may identify various aspects of a caller's voice that may help select modulations to apply to an agent's voice. Some voice characteristics may include a pitch, a tone, a rhythm, a resonance, a tempo, texture (including range of tones, feeling), and inflection, among others. These characteristics may be used to infer an emotional state of a caller, which in turn may be used to select one or more voice modulations to apply to a voice of an agent in conversation with the caller.

For example, a caller speaking at a high pitch, a fast tempo, and with a texture that indicates agitation (e.g., a high set of tones expressed in a narrow range) may indicate frustration, anxiety, or anger. In another example, a caller speaking at a high pitch, a fast tempo, and with a texture that indicates excitement (e.g., a wide range of tones including low and high tones) may indicate enthusiasm. In still another example, a low pitch, a slow tempo, and a texture that indicates frustration (e.g., a low set of tones expressed in a narrow range) may indicate exasperation. Inferring these types of caller emotional states (among others) may enable the system to select modulations to apply to a voice of the agent that will allow an emotional alignment between the agent and the caller. For example, modulations that help the voice of the agent sound calm (and/or calming) in response to caller frustration, sound sympathetic in response to caller frustration, or confident and helpful in response to caller exasperation may be useful in accomplishing one or more desired outcomes of the conversation.

In another example, a caller characteristic analyzer 122 may identify a purchase history associated with a caller (e.g., value of purchases over time, types of products, value of items currently in cart), a call history, and demographic characteristics (e.g., address, income level, family configuration). These data may also be used to select a voice modulation for an agent when speaking with the caller. For example, callers exhibiting a purchase history of gradually increasing purchase values over time may be convinced to upgrade a current purchase. The voice modulations applied to an agent voice to increase a value of a sale may be configured to establish trust and rapport (e.g., a "warmer," friendly tone) before initiating a portion of a conversation associated with the increased value sale. This may be a different set of voice modulations than for simply completing a requested sale (e.g., neutral tone with a higher rate of speech for efficiently completing a nearly completed sale).

The agent/product characteristic analyzer 124 may receive data corresponding to a conversation and characterize the actual, unmodulated, voice of an agent. The agent/product characteristic analyzer 124 may identify various aspects of the unmodulated voice of an agent and use this information, in part, to select modulations to apply to an agent's voice. For example, a voice of a first agent may have a naturally low pitch and tone, a slow rhythm, and a uniform texture. These voice characteristics may help accomplished a desired outcome of a conversation when responding to a frustrated or exasperated caller seeking product support, but may be less likely to accomplish a desired outcome of an excited caller seeking to buy a product. In light of this, the agent/product characteristic analyzer 124 may identify, select, and apply voice modulations to an agent's voice.

As described above, example voice characteristics may include a pitch, a tone, a rhythm, a resonance, a tempo, texture (including range of tones, feeling), a regional accent, a language dialect, and inflection, among others. These characteristics may be used to select one or more voice modulations to apply to a voice of an agent in conversation with a caller. In some examples, an agent voice profile that identifies one or more characteristics of a voice of an agent may be stored in the data repository based on the assumption that some characteristics of a voice of an agent will either be consistent from day to day or vary within a relatively narrow range of characteristic values. Storing an agent voice profile may improve computational efficiency and speed by reducing the real-time analysis required by the system.

In some examples, the voice selector may also receive a subset of prior conversations identified by the optional similarity score generator 118. These prior conversations may be analyzed to identify one or more voice modulations that may be applied to the target conversation.

The agent/product characteristic analyzer 124 may also store data associated with products and/or services. These data may be used to select voice modulations to apply to an agent's voice. For example, a higher cost product (e.g., a car, a boat, a house) may be associated with a steadier, calmer, and professional voice. Lower cost products (magazine subscriptions, housewares, consumables, food) are not associated with a slower, calmer voice presentation. In fact, because of the lower value aspect, selling lower cost products may instead be associated with a faster rate of speech to reduce the time spent by the caller on purchasing a lower value product. Similarly, a product associated with many quality problems may be associated with a patient voice presentation (e.g., lower tone, slower tempo, slower rhythm, less variation in tones) because many callers may be frustrated or upset and contacting an agent to report a problem.

In some embodiments, the confidence score generator 126, which may generate confidence scores for one or more voice modulations identified by the voice selector 120 as candidate voice modulations. The confidence score generator 126 may optionally analyze one or more of the prior conversations stored in a data repository and/or provided by the similarity score generator 118 to determine (1) whether candidate voice modulations were used in one or more prior conversations and (2) whether one or more of the applied candidate voice modulations were associated with accomplishing a desired outcome of the corresponding conversation.

For example, the confidence score generator 126 may determine rates at which a desired outcome of prior conversations were accomplished. The confidence score generator 126 may use this information to determine a confidence score based on the rate and a proportion of these successful conversations in which identified candidate voice modulations were used. For example, a success rate of 10% of prior conversations using selected voice modulations may be used to scale a confidence score by a factor of 0.1. A success rate of 100% of prior conversations using selected voice modulations may be used to scale a confidence score by a factor of 1 (i.e., no change) or 2 (doubling the confidence score).

Example confidence scoring algorithms that use this information may include, but are not limited to, statistical hypothesis testing, resampling, regression analysis, along with other similar techniques. In some cases, a confidence score may be based on filtered and/or clustered data in which any of the data provided to the confidence score generator 126 is filtered and/or clustered and the confidence score algorithm executed on a subset of the filtered and/or clustered data.

Upon one or more of the caller characteristic analyzer 122, agent/product characteristic analyzer 124, and confidence score generator 126 completing their corresponding analyses, the voice selector 120 may identify and select one or more modulations to apply (by the voice modulator 128) to a voice of an agent in conversation with a caller. As described above, the one or more modulations identified and selected by the voice selector 120 may be associated with accomplishing one or more desired outcomes provided by the desired outcome generator 114. Once the voice selector 120 identifies voice modulations, the voice selector 120 may transmit the identified voice modulations to the voice modulator 128.

Examples of modulations include instructions and/or control signals transmitted from the voice selector 120 to the voice modulator 128 to alter (e.g., increasing, decreasing, or otherwise changing) one or more of a pitch, a tone, a rhythm, a resonance, a tempo, texture (including range of tones, feeling), and/or inflection of a voice of an agent. Other voice characteristics may also be altered.

The voice modulator 128 receives the selected modulations from the voice selector 120 and applies the modulations to a voice signal transmitted by an agent to a caller via a voice communication media. Whether via session initiation protocol (SIP), voice over internet protocol (VOIP), the publicly switched telephone network (PSTN), or some other voice communication technology, the voice modulator 128 may receive voice input signals from the agent (e.g., via a microphone) and process the voice input signals before permitting transmission to the caller via a voice communication system.

In some examples, to apply voice modulations contemporaneously with a conversation, the voice modulator 128 may receive a voice input signal from an agent and store the signals in a buffer or other memory structure. The voice modulator 128 may then apply the modulations selected by the voice selector 120. For example, a tempo of the agent's voice may be increased or decreased based on instructions transmitted by the voice modulator 128 to the communication application (e.g., a SIP application), and more specifically to a sound control interface (commonly referred to as a "mixer") in communication with the communication application. Similarly, a pitch, tone, rhythm, resonance, or inflection may be adjusted by transmitting instructions to a sound control interface, which then applies the modulations. In other examples, the voice modulator 128 may alter the stored voice input signal itself by applying transformations to the stored voice signal.

Frontend interface 130 manages interactions between ML application 104 and clients 102A, 102B. For example, a client may submit requests to perform various functions and view results through frontend interface 130. A client in this context may be a human user, such as a system administrator, or another application, such as a shell or client application. In some examples, a client 102A, 102B is an interface used by an agent to communicate with another party (e.g., a caller).

In some embodiments, frontend interface 130 is a presentation tier in a multitier application. Frontend interface 130 may process requests received from clients, such as clients 102A, 102B, and translate results from other application tiers into a format that may be understood or processed by the clients. Frontend interface 130 may be configured to render user interface elements and receive input via user interface elements. For example, frontend interface 130 may generate webpages and/or other graphical user interface (GUI) objects. Client applications, such as web browsers, may access and render interactive displays in accordance with protocols of the internet protocol (IP) suite. Additionally or alternatively, frontend interface 130 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 132 provides an interface for executing actions using computing resources, such as external resources 140A, 140B. Action interface 132 may include an API, CLI, or other interfaces for invoking functions to execute actions. One or more of these functions may be provided through cloud services or other applications, which may be external to ML application 104. For example, one or more components of system 100 may invoke an API to access data stored in data repository 134 for use as a training materials for the machine learning application 104. As another example, an API in the action interface 132 may access communication systems used by agents and callers so as to execute real-time analysis of the conversations. It will be appreciated considering these examples that the actions that are performed may vary from implementation to implementation.

In some examples, the action interface 132 may provide an interface for a user to use a communication application, such as one or more of SIP, VOIP, PTSN, among others. In some examples, the action interface 132 may also provide an interface by which voice modulations are applied by the voice modulator 128 to a target conversation, either directly or to a buffered portion of the conversation. That is, the action interface 132 may receive voice signals transmitted from an agent microphone, apply one or more modulations, and subsequently transmit modulated voice signal to the communication application for transmission to a caller.

In some embodiments, external resources 140A, 140B are network services that are external to ML application 104. Example cloud services may include, but are not limited to, social media platforms, email services, short messaging services, enterprise management systems, verbal communication systems (e.g., internet based voice communications, text chat communications, PTSN communications systems) and other cloud applications. Action interface 132 may serve as an API endpoint for invoking a cloud service. For example, action interface 132 may generate outbound requests that conform to protocols ingestible by external resources 140A, 140B. Action interface 132 may process and translate inbound requests to allow for further processing by other components of ML engine 110. Action interface 132 may store, negotiate, and/or otherwise manage authentication information for accessing external resources 140A, 140B. Example authentication information may include, but is not limited to, digital certificates, cryptographic keys, usernames, and passwords. Action interface 132 may include authentication information in the requests to invoke functions provided through external resources 140A, 140B.

In some examples, one of external resources 140A, 140B may corresponding to a communication protocol or communication system that enables communication between an agent and a caller. Examples include SIP, VOIP, and/or PTSN communication systems.

In some embodiments, ML application 104 is a cloud service, such as a software-as-a-service (SaaS) or a web service. Clients, such as clients 102A, 102B, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application. In one or more embodiments, the system 100 may include or more data repositories 134. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository, such as the data repository 134 shown, may be implemented or may execute on the same computing system as the machine learning application 104. The data repository 134 may be communicatively coupled to the machine learning application 104 via a direct connection or via a network.

The example data repository 134 includes two data partitions: a characteristics store 136 and a conversation store 138. The characteristics store 136 may store data that corresponds to an agent voice profile, a caller profile, and/or a product profile. For example, other elements of the system described above may access the voice profile of an agent in preparation for applying voice modulations. In another example, the system may access characteristics associated with a particular caller to identify possible voice modulations that may make it more likely that the desired outcome of the conversation is achieved with that particular caller. If a caller has a particular regional accent or used a regional dialect, the system may identify this characteristic and apply voice modulations to a voice signal of an agent that mimics the regional speech pattern of the caller, thereby improving the natural rapport between the caller and the agent. In another example, if the caller is associated with characteristics that indicate a slow pace of communication, the system may slow a tempo or regulate a rhythm of speech from the agent. In still another example, the characteristics store 136 may store characteristics for various products or services that may be the subject of a conversation. The system may identify stored product or service characteristics that are shared with (or similar to) a product or service that is a subject of a target conversation. The system may then identify voice modulations that are associated with accomplishing a desired outcome in the stored, similar conversations and provide the voice modulations to the voice selector 120.

The conversation store 138 may store recordings of prior conversations, or representations of prior conversations, (e.g., feature vectors representing voice modulations, desired outcomes, conversation characteristics). These may be accessed by the system in an analysis of a current, target conversation. In some examples, the conversation store 138 may also store a summary (e.g., a feature vector) of a conversation in which modulated voice characteristics (e.g., a modulated and transmitted tempo, rhythm, pitch, tone, texture) are stored along with product/service characteristics, a corresponding desired outcome, and an indication of whether the desired outcome was accomplished or not accomplished. These data may be used by the various aspects of the machine learning engine 110 as a training corpus, as a data source for similarity analysis, confidence score generation, and ultimately voice modulation selection.

Associations between voice modulations used in conversations, agents using the phrases, and whether or not the desired outcome was achieved may be synthesized and/or generated by various elements of the system 100, as described here.

3. Voice Modulation Selection Using Confidence Scores

As indicated above, embodiments described herein may identify at least one desired outcome of a conversation and identify (and apply) one or more voice modulations that may aid in accomplishing the desired outcome(s). In some embodiments, a machine learning algorithm may be applied to identify the one or more voice modulations. In other embodiments, an analytical system using similarity scores and confidence scores may be used to identify the one or more voice modulations.

Figure 2:
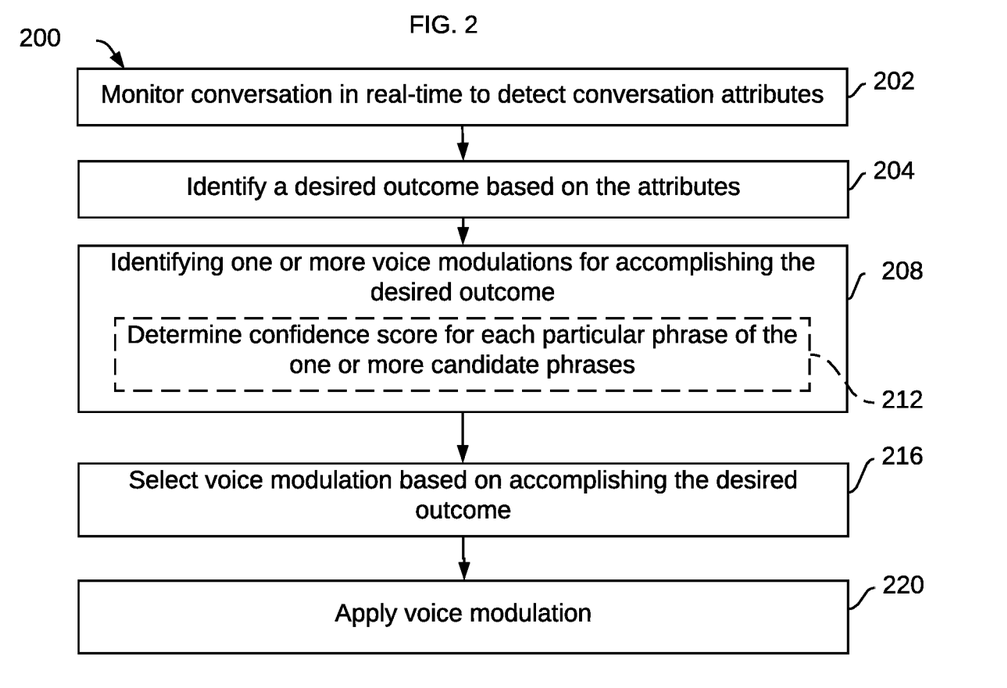
FIG. 2 illustrates an example set of operations for selecting a voice modulation of a voice of an agent, in real time, to improve a desired outcome of a voice call, in accordance with one or more embodiments.
Figure 3:
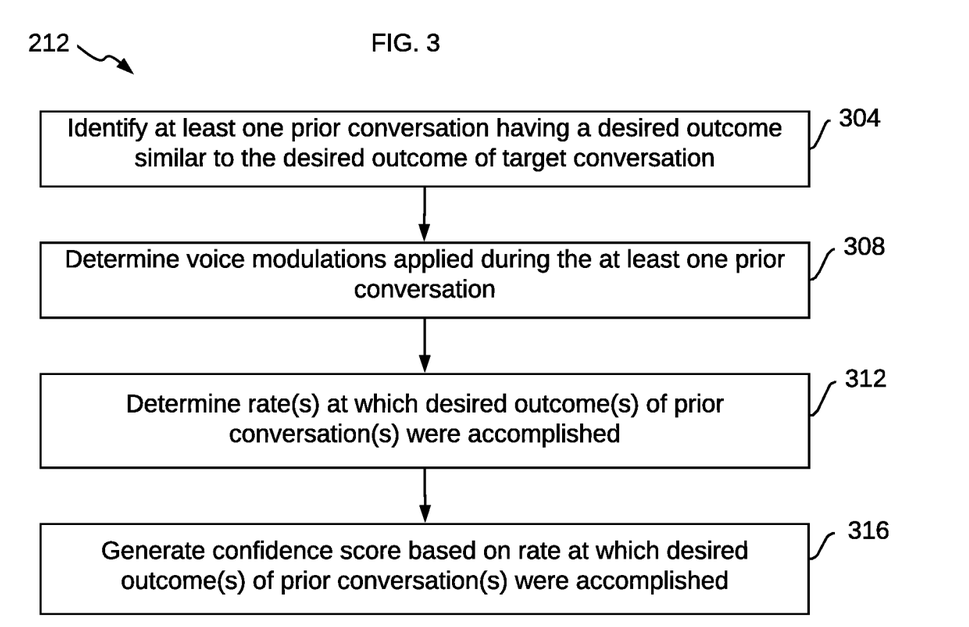
FIG. 3 illustrates an example set of operations for generating confidence scores to use in the selection of a voice modulation, in accordance with one or more embodiments.

FIGS. 2 and 3 illustrates example sets of operations for selecting voice modulations to apply to a voice of an agent, in accordance with one or more embodiments. One or more operations illustrated in FIGS. 2 and 3 may be modified, rearranged, or omitted all together. Accordingly, the particular sequence of operations illustrated in FIGS. 2 and 3 should not be construed as limiting the scope of one or more embodiments.

The method 200 begins by monitoring a conversation in real-time to detect one or more conversation attributes (operation 202) and using the attributes to identify a desired outcome of the conversation (operation 204).

At a high level, conversation attributes may be associated with one or more of an agent, a call type, a caller, and/or a product or service that is the subject of a conversation. Examples specific aspects of a call that may be used to indicate attributes include phrases, words, time periods, or other aspects of the conversation that can be used to identify ultimate or interim desired outcomes for the conversation. For example, the initiation of a conversation may be an attribute that is associated with an interim desired outcome of establishing rapport between an agent and a caller.

For example, call types (e.g., sales, customer support, help) may be indicated by phrases such as "I would like to order," "I have a complaint," "I need help." Each of these conversation types may in turn be associated with a different (ultimate) desired outcome. Phrases such as "how much does it cost," "that is too expensive," "it still doesn't work" may be conversation attributes associated with interim desired outcomes for further inquiry by the agent. Phrases such as "I would like to order" or "do you still have it in stock" or "when will it be delivered" may be associated with a sales call type.

Similarly, a profile of a caller (e.g., a customer profile) may be used to identify attributes of a conversation that the system may use for identifying interim and/or ultimate goals of a conversation. Examples include demographic characteristics of a conversant (e.g., age, income bracket, geographic location, family configuration), browsing history (e.g., products or information pages viewed on a website or mobile application), product engagement history (e.g., products placed in a website shopping cart).

In one example, if products have been placed in a shopping cart, this attribute may be used to generate a desired outcome of completing the sale of those products. If product help forums or pages have been viewed by the caller, this attribute may generate a desired outcome of resolving a product support issue. In other examples, a profile may indicate a receptiveness of a caller to being sold a more expensive version of a product. In still another example, a profile may indicate that the caller may benefit from a lower content density or content delivery rate by reducing a number of concepts presented per sentence or per unit time or providing a slower presentation of information, respectively. The system may use any combination of these attributes, and other caller attributes, for selecting modulations to apply to an agent's voice.

The system may also use a product or service that is the subject of a call to identify attributes. Analogous to situations described above, the product or service type may indicate a call type. For example, a product no longer actively sold may be associated with a product support question. Alternatively, a product associated with a high error rate, a high warranty claim rate, or a low customer satisfaction rate may be associated with a customer complaint call type. Also, as described above, a value of a product being sold may be associated with certain voice modulations and/or characteristics.

The system may identify one or more voice modulations for accomplishing the desired outcome identified based on the conversation attributes (operation 208). As described above, the system may identify (and ultimately select) voice modulations that are associated with increasing a rate of accomplishing interim and/or ultimate desired outcomes. In some examples, a voice modulation may correspond to one or more voice characteristics, each of which may be selected independently from other voice characteristics. For example, a speed of speech may be selected independently from a tone of the voice. A regional accent may be selected independently from both the speed and the tone. In some examples, the voice characteristics may be associated with a range of values so that any of the voice characteristics may be modified throughout a wide range of values. Because some or all of the voice characteristics may be modified independently from one another and throughout a range of selectable values, the system may precisely select a set of voice modulations from a vast range of possible combinations.

Figure 5:
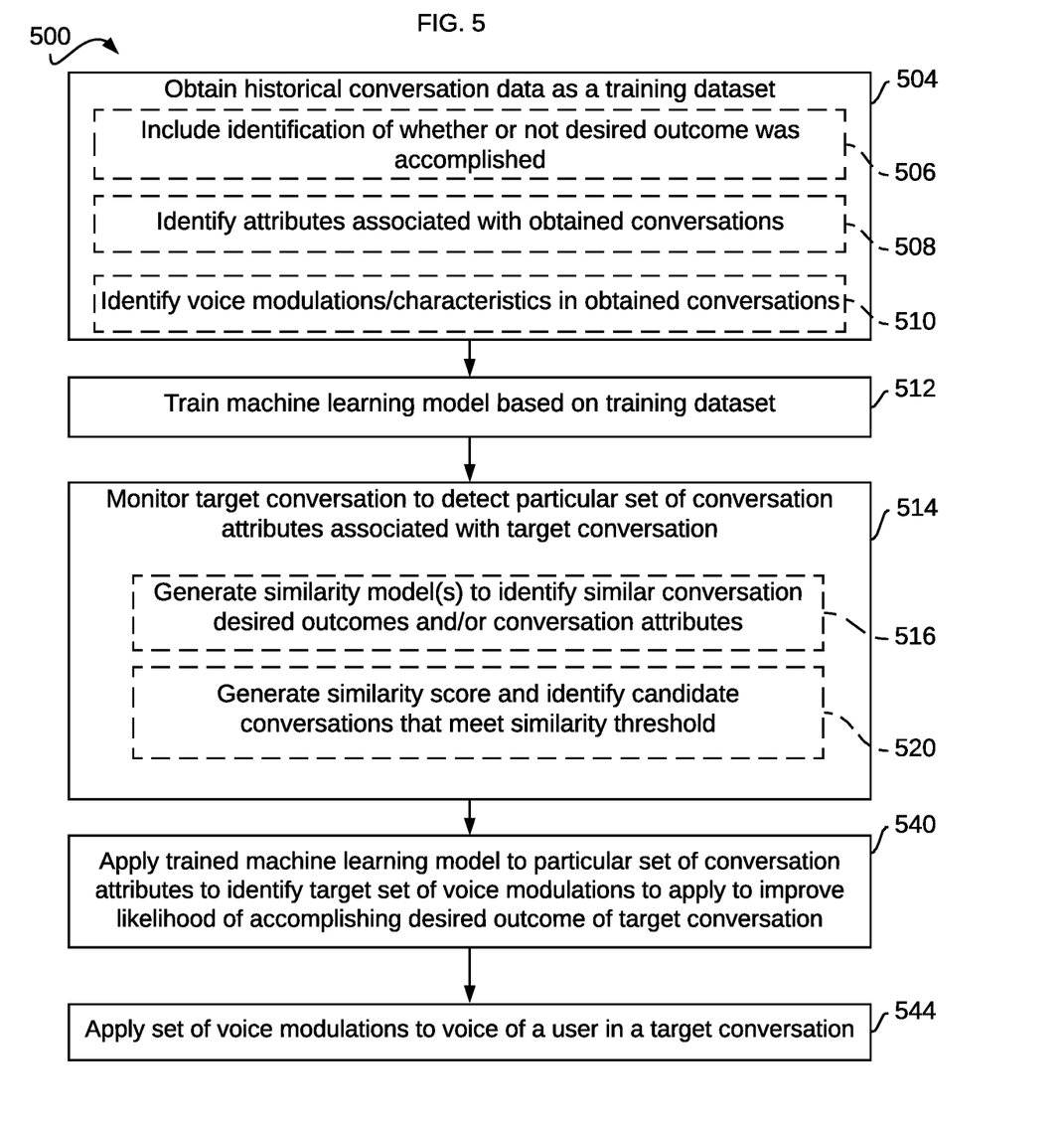
FIG. 5 illustrates an example set of operations for training and applying a machine learning (ML) model for selecting a voice modulation of a voice of an agent, in real time, to improve a desired outcome of a voice call, in accordance with one or more embodiments.

In some examples the system may use a trained machine learning model for identifying the one or more voice modulations to apply (operation 208). FIG. 5 illustrates example operations for selecting and applying voice modulations using a trained machine learning model. These example operations are described below.

In some examples, the system may generate confidence scores associated with various voice modulations and the rates at which the various voice modulations are associated with accomplishing a desired outcome (operation 212). FIG. 3 illustrates example operations associated with generating these confidence scores.

Turing to FIG. 3 and its description of the operation 212, the system may first identify one or more prior conversations having a desired outcome similar to the desired outcome of the conversation analyzed by the system in real-time (i.e., the "target" conversation) (operation 304). In some examples, the system may identify the prior conversations using metadata (e.g., labels, desired outcomes, attributes) stored in association with stored representations of conversations, stored recordings of conversations, stored representations of voice modulations, and combinations thereof. The system may search this metadata of the stored phrases using the desired outcome and/or attributes associated with the target conversation.

In other examples, the system may identify these prior conversations having a similar desired outcome by comparing a feature vector representation of attributes associated with the target conversation to feature vectors of attributes associated with prior conversations. In some examples, the system may execute a similarity analysis (e.g., cosine similarity) between the feature vector associated with the target conversation and the feature vectors associated with the prior conversations. Prior conversations having a similarity score above a threshold may be identified. Alternatively, the system may execute a similarity analysis based on the desired outcome of the prior conversations compared to the desired outcome of the target conversation. By comparing vector representations of the desired outcomes, instead of the individual attributes, the system may improve the speed and efficiency of the comparison analysis. Alternatively, the system may compare both the desired outcomes and the attributes.

Upon identifying at least one prior conversation having a desired outcome similar to the target conversation, the system then determines the voice modulations applied during the at least one prior conversation (operation 308). The system may determine applied voice modulations by analyzing stored versions of the identified conversations selected in the operation 304. The stored versions or stored representations of the identified prior conversations may include a record of the voice modulations applied during the prior conversations and/or a record of the final voice modulation transmitted to the caller via the communication system. In other words, the system may use the stored representation of a prior conversation to identify the particular modulation(s) applied to a voice of a particular agent or identify the voice characteristics of the final voice transmitted to a caller. These prior conversation modulations may function as a baseline to which subsequent analyses of a target conversation may be compared.

The former case may be useful for situations in which the agent in the prior conversation is the same agent in the target conversation or has a natural voice similar to the agent in the target conversation. That is, assuming the natural voice characteristics of agents in the prior conversation are similar to the natural voice characteristics of the agent in the target conversation, the voice modulations in prior conversations may, if selected, be applied to the agent voice in the current conversation. The latter case of analyzing the final voice characteristics may be useful for situations in which the voices used in prior conversations are not similar to the voice of the agent in the target conversation. As a result of agent voice differences, the system directly applying a previously applied modulation from a prior conversation to the target conversation would not produce the desired voice characteristics associated with accomplishing a desired objective.

The system may determine rates at which desired outcome or outcomes of the prior conversation or conversations were accomplished (operation 312). For example, the system may identify the rate at which sales were completed for sales conversations, customers were satisfied for customer support conversations, and technical questions were resolved for help questions. The system may generate a rate using any number of algorithms. The system may in some examples determine a rate by identifying a number of conversations in which the desired outcome was accomplished using the voice modulations and divide this number by a total number of conversations of the same type (e.g., sales, help desk) in which the voice modulations were used.

The system may generate a confidence score associated with the voice modulation based on the determined rate (operation 316). Example confidence scoring algorithms that use this information may include, but are not limited to, statistical hypothesis testing, resampling, regression analysis, along with other similar techniques. In some cases, a confidence score may be based on filtered and/or clustered data in which any of the data used to generate the score are filtered and/or clustered. The system may then execute the confidence score algorithm on a subset of the filtered and/or clustered data.

Similarly, the system may determine whether some voice modulations are associated with an unfavorable response from the caller or a pattern of failing to accomplish a desired outcome. Examples of unfavorable responses include lengthy silences, abrupt terminations of the conversation, or express negative statements (e.g., "no," "that won't work," "not interested"). Unfavorable responses in a prior conversation may be used to decrease a confidence score for a similar voice modulation for the current conversation. The confidence scores may be used to select and/or identify a voice modulation.

Returning to FIG. 2 and resuming the description of the method 200, the system may select a voice modulation based on the preceding identification operation 208 (operation 216). As described above, the system may select the voice modulation based on a likelihood of accomplishing the desired outcome of the conversation upon using the voice modulation. As also described above, the selected voice modulation may include an alteration of one or more natural voice characteristics of an agent, including alteration of a pitch, a tone, a rhythm, a resonance, a tempo, texture (including range of tones, feeling), and inflection, among others.

The system then applies the selected voice modulations to the voice of an agent to achieve one or more voice characteristics that are associated with accomplishing the desired goal of the conversation (operation 220). The system may apply the selected voice modulations by altering one or more voice characteristics by providing instructions to a "sound mixing" application to increase, decrease, or otherwise alter any of the previously described voice characteristics corresponding to the voice of the agent in the target conversation. Once altered, the system may pass the altered voice from the sound mixing application to the communication system for transmission to a caller.

Figure 4:
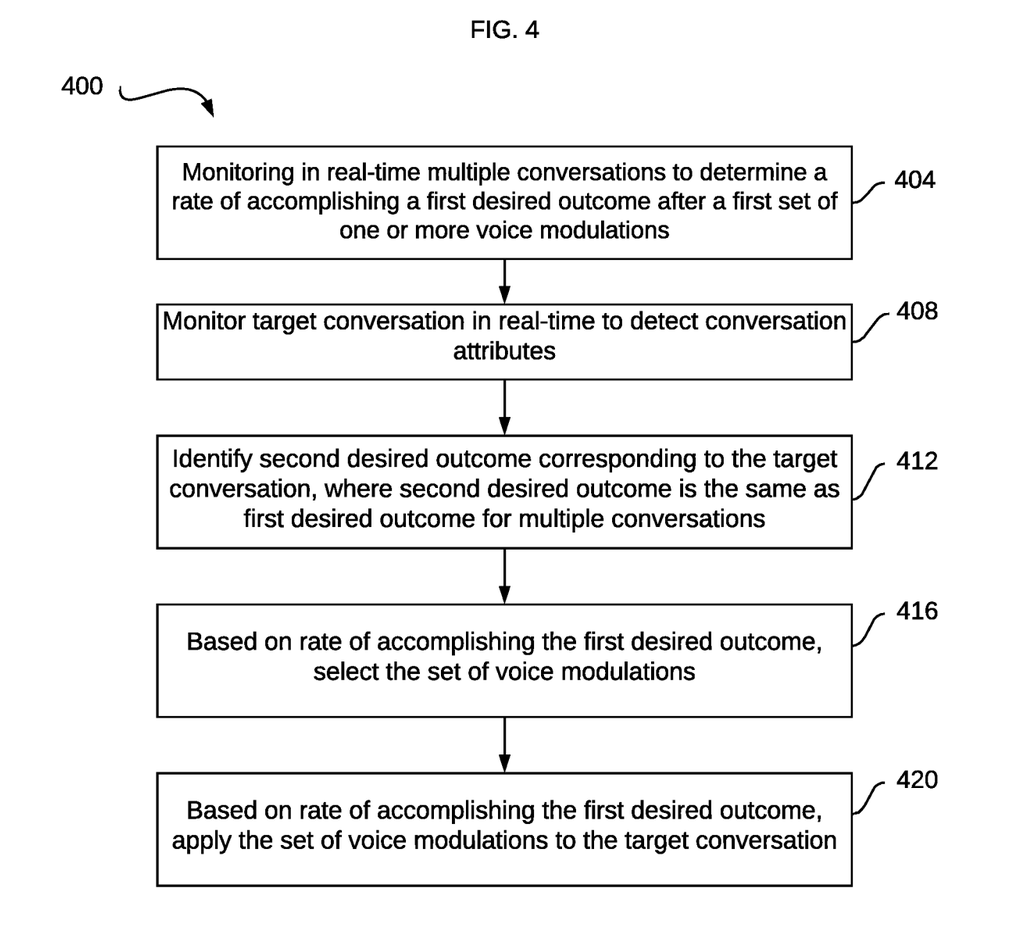
FIG. 4 illustrates an example set of operations for selecting a voice transformation of a voice of an agent, in real time, by monitoring other conversations in real-time and using an analysis of the other conversations to identify and select a voice transformation to apply to a target conversation, in accordance with one or more embodiments.

In a variation on the method 200, the system may also identify voice modulations beneficial for accomplishing both interim and ultimate desired outcomes using analyses performed in real-time on conversations occurring contemporaneously with the target conversation. Example operations for this embodiment are illustrated in FIG. 4 and collectively referred to as a method 400.

The method 400 may begin by monitoring multiple conversations in real-time (operation 404). At a high level, the analysis performed in the method 400 may use conversations concurrent with a target conversation as a data resource by which to evaluate effectiveness of one or more voice modulations in accomplishing one or more desired outcomes for the target conversation. The monitoring may use machine learning, vector analysis, confidence scores, and any other techniques described herein to identify (1) desired outcomes corresponding to each of the multiple conversations, (2) rates at which groups of a same (or similar) type of desired outcome are accomplished, and (3) voice modulations used in the conversations.

In a specific example, in which the system focuses on a first desired outcome, the system may execute real-time monitoring to identify conversations in which the first desired outcome is relevant (operation 404).

The system may also identify a first set of voice modulations used in the corresponding identified conversations (operation 404). The system may also determine, in real-time, a rate at which the first desired outcome is accomplished in the monitored conversations subsequent to using the first set of one or more voice modulations (operation 404). The system may use any of the techniques described above to identify the desired outcome, the conversation attributes, the voice modulations, and the rate of accomplishing the desired outcome.

The system may monitor a target conversation in real-time to detect conversation attributes associated with the target conversation (operation 408). The techniques described above in the context of operation 202 may be applied to the operation 408. Also using techniques described above, the system may analyze the attributes to identify a desired outcome associated with the target conversation that is the same as the particular desired outcome identified in the operation 404. Based on the rate at which the particular desired outcome is accomplished in the conversations monitored in the operation 404, the system selects the applied voice modulations (operation 416) and applies them to the target conversation (operation 420).

4. Voice Modulation Selection Using a Trained Machine Learning Model

FIG. 5 illustrates an example set of operations (shown as method 500) for training a machine learning model to identify a desired objective of a conversation and associating one or more voice modulations with an increased likelihood of accomplishing a desired objective in accordance with one or more embodiments. Once trained, the method 500 includes embodiments in which a trained machine learning model may be applied to a target conversation so as to identify and apply one or more voice modulations that are likely to increase a likelihood of accomplishing a desired outcome of the conversation in accordance with one or more embodiments.

The method 500 may begin by identifying or obtaining historical conversation data. For example, the system may obtain electronic recordings, transcriptions, or representations (e.g., labeled feature vectors) of conversations (operation 504). The historical conversation data may include a label, token, or other identification to indicate whether a desired outcome was accomplished (operation 508), identified or identifiable attributes (operation 512), and identified or identifiable voice modulations or voice characteristics (e.g., unmodulated characteristics of a voice) (operation 510). In some examples, a label, token, or other mechanism may be used to optionally identify a desired outcome of corresponding conversations. These data (conveniently referred to as a training dataset) thus contain information that the machine learning model may use to associate successful achievement of a desired outcome with one or more voice modulations (and similarly, some voice modulations with an unsuccessful attempt at accomplishing a desired outcome).

The system may train a machine learning model using the training dataset (operation 512). Types of ML models include but are not limited to linear regression, logistic regression, linear discriminant analysis, classification and regression trees, naïve Bayes, k-nearest neighbors, learning vector quantization, support vector machine, bagging and random forest, boosting, backpropagation, and/or clustering.

The training techniques are described above in the context of FIG. 1. At a high level, however, the machine learning model may learn to associate any number of voice characteristics (and any combination of voice characteristics and/or values of voice modulation parameters) with accomplishing one or more desired outcomes. For example, the machine learning model may associate voice characteristics, voice modulations, conversation attributes with success rate, resolution rate, product/service experience, among others. In some embodiments, the training set may include conversation attributes associated with a particular caller, such as demographic characteristics, voice characteristics (such as those indicating frustration, interest, excitement), purchase history, and the like. In some embodiments, the machine learning model may be trained to associate voice modulations and/or conversation attributes with a particular product, or product attributes. Examples of product attributes include brand, cost, unit profit margin, quality history, product line price profile (e.g., products in a line that cost more or less than a discussed product), among others.

The system may apply the trained machine learning model to monitor a target conversation (operation 514). In some examples, the monitoring operation may identify conversation attributes including a desired outcome of the conversation, as well as attributes associated with the participants in the conversation. For example, some conversation attributes, described above, may be associated with an emotional state of a caller, a voice profile of an agent, a product type, a regional accent of one or both of the caller and the agent, and the like.

In some examples, the trained machine learning model may analyze a target conversation by identifying one or more similar conversations in the training dataset using a similarity model (operation 516). The similarity model may identify various conversations, and more specifically conversation attributes and desired outcomes that may be similar to one another despite differences in context (e.g., selling building supply materials versus selling appliances). The similarity model may also identify similar conversations despite differences in words used in the different conversations. The similarity model may perform this analysis by, for example, identifying common conversational attributes, such as conversation type, desired outcome, caller voice characteristics (e.g., frustration, excitement, fast speech), product type (e.g., heavy machinery, appliances, passenger vehicles), among others.

In some examples, the similarity model may execute its similarity analysis to identify similarities between agents, similarities between customers, and/or similarities between products. Upon identifying similar characteristics between one or more of agents, customer, and/or products, the system may then expand the data within a training set by looking for desired outcomes and the voice modulations associated with accomplished desired outcomes in the various similar sources.

A similarity score may be generated using similarity measures (e.g., cosine similarity) of vectorized representations of the conversation data, whether conversation attributes, desired outcomes, voice modulations/characteristics, or combinations thereof, for example (operation 520). Using the similarity score, the system may identify conversations that meet a similarity threshold (operation 520).

The system may apply the machine learning model to the conversation attributes of the target conversation to identify a set of target voice modulations (operation 540). The identified modulations, when applied, may be associated with an improved likelihood of accomplishing the desired outcome of the target conversation. The identified target set of modulations may then be applied to a voice of an agent in the target conversation using techniques described above so that the voice of the agent has voice characteristics (e.g. speed, tone, regional accent) associated with successfully achieving a desired outcome of the conversation (operation 544).

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 6:
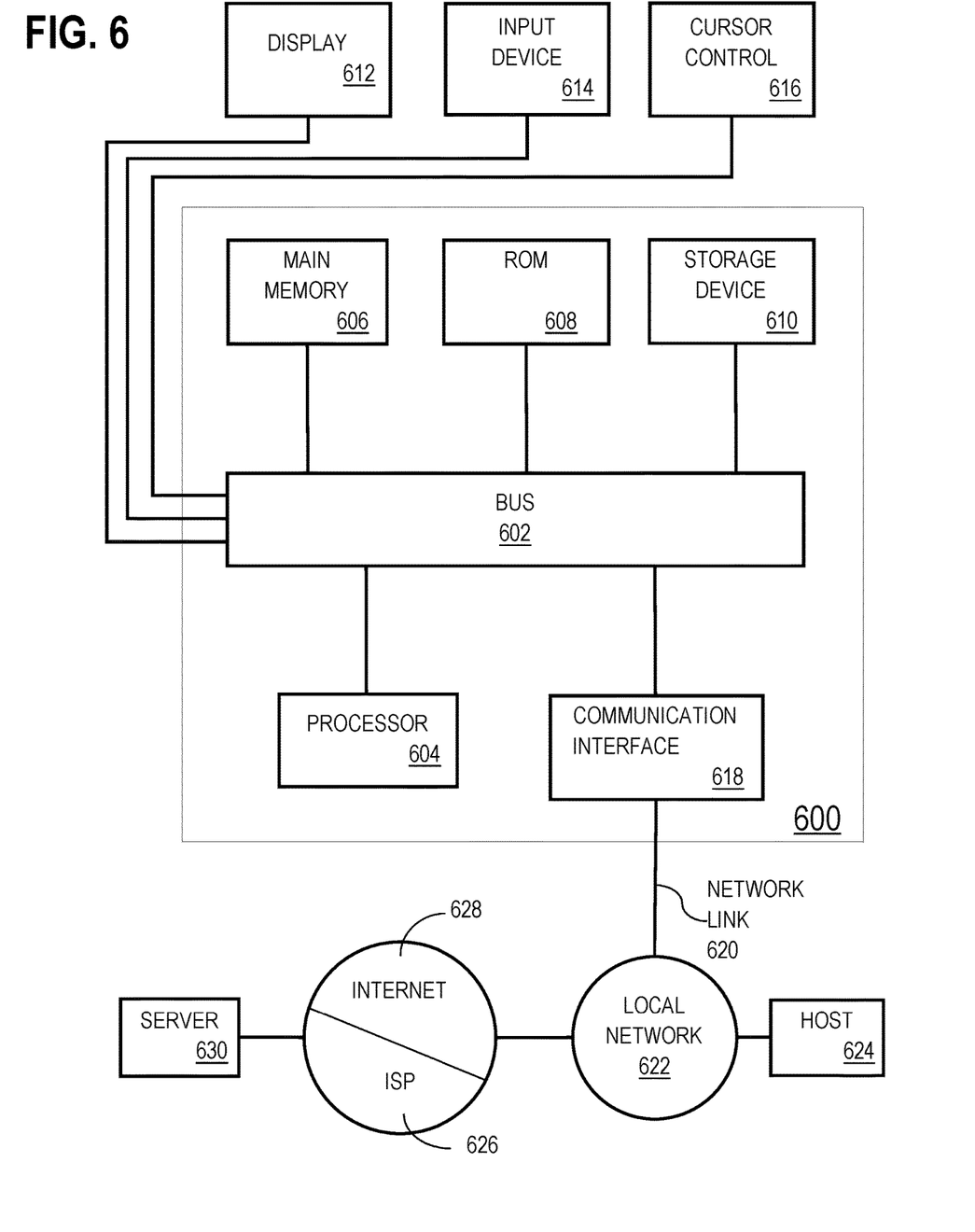
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    monitoring a conversation in real-time to detect one or more attributes of the conversation;
    identifying a desired outcome of a conversation based on the one or more attributes;
    identifying a plurality of voice modulations for accomplishing the desired outcome of the conversation;
    determining a confidence score for each voice modulation of the plurality of voice modulations, the confidence score associated with a likelihood that the desired outcome will be accomplished subsequent to using the voice modulation to a participant's voice in the conversation, wherein determining the confidence score further comprises;
        identifying at least one prior conversation having a prior desired outcome similar to the desired outcome of the conversation;
        determining that one or more voice modulations of the plurality of voice modulations were used in the at least one prior conversation;
        determining one or more rates at which the prior desired outcome of the at least one prior conversation was accomplished;
        determining the confidence score of the one or more voice modulations in proportion to the rate at which the desired outcome were accomplished in the at least one prior conversation;
    based at least on a first confidence score of accomplishing the desired outcome subsequent to using a first voice modulation of the plurality of voice modulations: selecting the first voice modulation from the plurality of voice modulations; and
    applying the first voice modulation to the participant's voice.

2. The one or more media of claim 1, wherein:
    a conversation type is identified based on the one or more attributes of the conversation; and
    the desired outcome of the conversation is based, at least in part, on the conversation type.

3. The one or more media of claim 2, wherein:
    the conversation type comprises one of a sales conversation, a help desk conversation, a customer retention conversation, and a customer care conversation; and
    the desired outcome of the conversation comprises completing a sale, answering a question, and resolving a customer complaint, respectively.

4. The one or more media of claim 1, wherein the one or more voice modulations applied to the voice of the participant comprises one or more of altering a tone, a speed, and a regional accent.

5. The one or more media of claim 1, wherein the one or more voice modulations applied to the voice of the participant comprises one or more of altering a content density.

6. The one or more media of claim 1, wherein determining the confidence score further comprises:
    identifying a set of voice modulations used in a prior conversation having a desired outcome similar to the desired outcome for the conversation;
    determining similarity scores between the set of voice modulations used in the prior conversation and corresponding voice modulations of the one or more voice modulations; and
    using the similarity scores as a factor in determining the confidence scores of the corresponding one or more voice modulations.

7. The one or more media of claim 1, wherein determining the confidence score further comprises basing the confidence score on a rate at which desired outcomes are accomplished.

8. A method comprising:
    monitoring a conversation in real-time to detect one or more attributes of the conversation;
    identifying a desired outcome of a conversation based on the one or more attributes;
    identifying a plurality of voice modulations for accomplishing the desired outcome of the conversation;
    determining a confidence score for each voice modulation of the plurality of voice modulations, the confidence score associated with a likelihood that the desired outcome will be accomplished subsequent to using the voice modulation to a participant's voice in the conversation, wherein determining the confidence score further comprises;
        identifying at least one prior conversation having a prior desired outcome similar to the desired outcome of the conversation;
        determining that one or more voice modulations of the plurality of voice modulations were used in the at least one prior conversation;
        determining one or more rates at which the prior desired outcome of the at least one prior conversation was accomplished;
        determining the confidence score of the one or more voice modulations in proportion to the rate at which the desired outcome were accomplished in the at least one prior conversation;

based at least on a first confidence score of accomplishing the desired outcome subsequent to using a first voice modulation of the plurality of voice modulations:
selecting the first voice modulation from the plurality of voice modulations; and
applying the first voice modulation to the participant's voice.

9. The method of claim 8, wherein:
a conversation type is identified based on the one or more attributes of the conversation; and
the desired outcome of the conversation is based, at least in part, on the conversation type.

10. The method of claim 9, wherein:
the conversation type comprises one of a sales conversation, a help desk conversation, a customer retention conversation, and a customer care conversation; and
the desired outcome of the conversation comprises completing a sale, answering a question, and resolving a customer complaint, respectively.

11. The method of claim 8, wherein the one or more voice modulations applied to the voice of the participant comprises one or more of altering a tone, a speed, and a regional accent.

12. The method of claim 8, wherein the one or more voice modulations applied to the voice of the participant comprises one or more of altering a content density.

13. The method of claim 8, wherein determining the confidence score further comprises:
identifying a set of voice modulations used in a prior conversation having a desired outcome similar to the desired outcome for the conversation;
determining similarity scores between the set of voice modulations used in the prior conversation and corresponding voice modulations of the one or more voice modulations; and
using the similarity scores as a factor in determining the confidence scores of the corresponding one or more voice modulations.

14. The method of claim 8, wherein determining the confidence score further comprises basing the confidence score on a rate at which desired outcomes are accomplished.

15. A system comprising:
at least one device including a hardware processor;
the system being configured to perform operations comprising:
monitoring a conversation in real-time to detect one or more attributes of the conversation;
identifying a desired outcome of a conversation based on the one or more attributes;
identifying a plurality of voice modulations for accomplishing the desired outcome of the conversation;
determining a confidence score for each voice modulation of the plurality of voice modulations, the confidence score associated with a likelihood that the desired outcome will be accomplished subsequent to using the voice modulation to a participant's voice in the conversation, wherein determining the confidence score further comprises;
identifying at least one prior conversation having a prior desired outcome similar to the desired outcome of the conversation;
determining that one or more voice modulations of the plurality of voice modulations were used in the at least one prior conversation;
determining one or more rates at which the prior desired outcome of the at least one prior conversation was accomplished;
determining the confidence score of the one or more voice modulations in proportion to the rate at which the desired outcome were accomplished in the at least one prior conversation;
based at least on a first confidence score of accomplishing the desired outcome subsequent to using a first voice modulation of the plurality of voice modulations:
selecting the first voice modulation from the plurality of voice modulations; and
applying the first voice modulation to the participant's voice.

16. The system of claim 15, wherein:
a conversation type is identified based on the one or more attributes of the conversation; and
the desired outcome of the conversation is based, at least in part, on the conversation type.

17. The system of claim 16, wherein:
the conversation type comprises one of a sales conversation, a help desk conversation, a customer retention conversation, and a customer care conversation; and
the desired outcome of the conversation comprises completing a sale, answering a question, and resolving a customer complaint, respectively.

18. The system of claim 15, wherein the one or more voice modulations applied to the voice of the participant comprises one or more of altering a tone, a speed, and a regional accent.

19. The system of claim 15, wherein the one or more voice modulations applied to the voice of the participant comprises one or more of altering a content density.

20. The system of claim 15, wherein determining the confidence score further comprises:
identifying a set of voice modulations used in a prior conversation having a desired outcome similar to the desired outcome for the conversation;
determining similarity scores between the set of voice modulations used in the prior conversation and corresponding voice modulations of the one or more voice modulations; and
using the similarity scores as a factor in determining the confidence scores of the corresponding one or more voice modulations.

21. The system of claim 15, wherein determining the confidence score further comprises basing the confidence score on a rate at which desired outcomes are accomplished.

* * * * *